(12) United States Patent
Westermann et al.

(10) Patent No.: US 8,484,794 B2
(45) Date of Patent: Jul. 16, 2013

(54) DEVICE FOR THE ARTICULATED CONNECTION OF A WIPER BLADE TO A WIPER ARM OF A WINDSHIELD WIPER

(75) Inventors: Klaus-Juergen Westermann, Bad Herrenalb (DE); Ursula Westermann, legal representative, Bad Herrenalb (DE); Bernhard Geppert, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 13/063,521

(22) PCT Filed: Aug. 6, 2009

(86) PCT No.: PCT/EP2009/060193
§ 371 (c)(1),
(2), (4) Date: May 26, 2011

(87) PCT Pub. No.: WO2010/028918
PCT Pub. Date: Mar. 18, 2010

(65) Prior Publication Data
US 2011/0265280 A1 Nov. 3, 2011

(30) Foreign Application Priority Data
Sep. 11, 2008 (DE) .......................... 10 2008 041 996

(51) Int. Cl.
*B60S 1/38* (2006.01)
(52) U.S. Cl.
USPC ................................. 15/250.32; 15/250.201

(58) Field of Classification Search
USPC ... 15/250.32, 250.43, 250.361, 250.44–250.48, 15/250.201
See application file for complete search history.

(56) References Cited

U.S. PATENT DOCUMENTS

| | | |
|---|---|---|
| 2004/0211021 A1 | 10/2004 | Weber et al. |
| 2007/0289079 A1 | 12/2007 | Van Bealen |
| 2008/0086830 A1 | 4/2008 | Kim |

FOREIGN PATENT DOCUMENTS

WO 2006106006 A1 10/2006

OTHER PUBLICATIONS

PCT/EP2009/060193 International Search Report, 2009.

*Primary Examiner* — Mark Spisich
*Assistant Examiner* — Andrew A Horton
(74) *Attorney, Agent, or Firm* — Michael Best & Friedrich LLP

(57) ABSTRACT

A device for the articulated connection of a wiper blade to a wiper arm includes a connection element connected to a carrier element of the wiper blade. The connection element has a side wall on each longitudinal side angled toward the wiper arm. The adapter encompasses the side wall of the connection element on each side and includes a spring switch on the side of the adapter facing the wiper arm and guide and retaining means for the wiper arm. The adapter has at least one first adapter element and one second adapter element. The first adapter element comprises the inner and outer side walls. The inner side walls are connected to each other via a base and a contact part. The contact part has an outer contour to receive a hook-shaped end of the wiper arm and a second adapter element on which the spring switch is disposed.

15 Claims, 8 Drawing Sheets

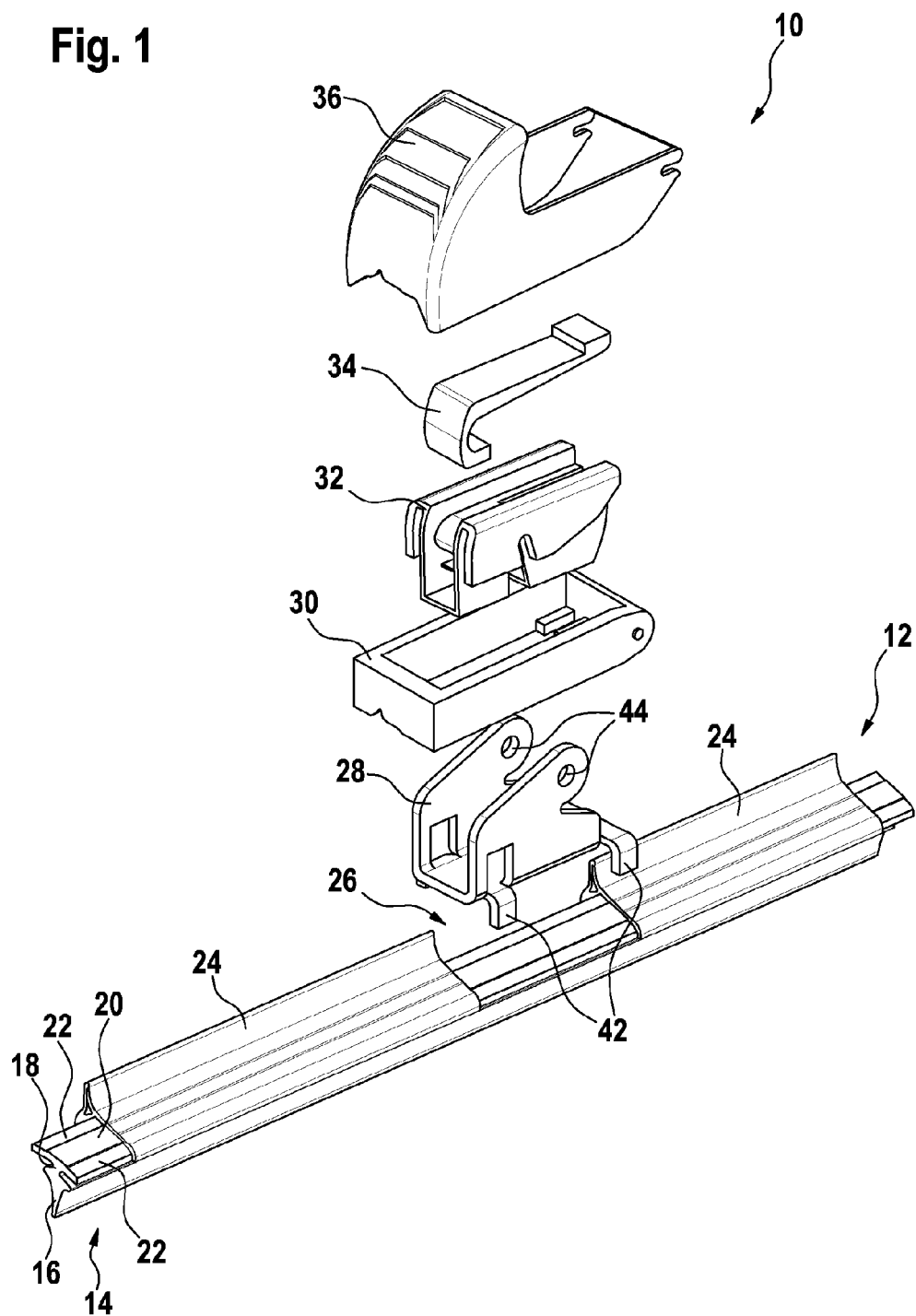

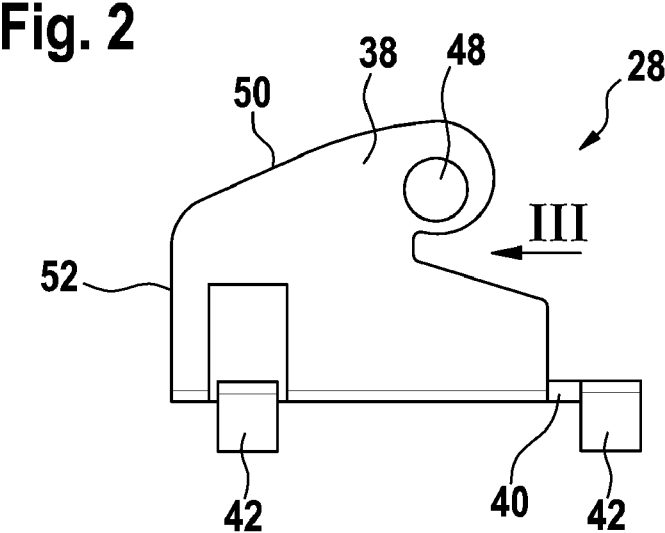
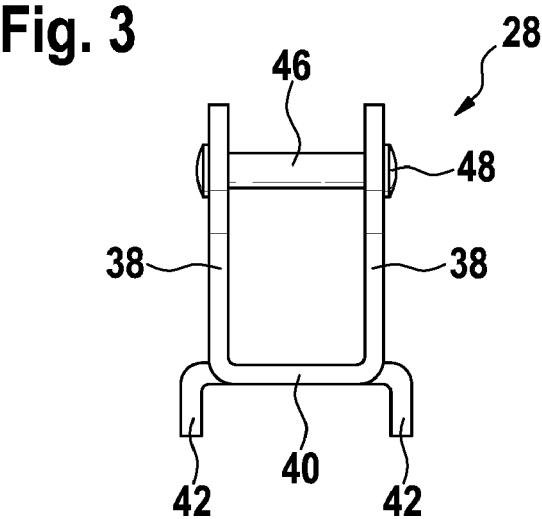
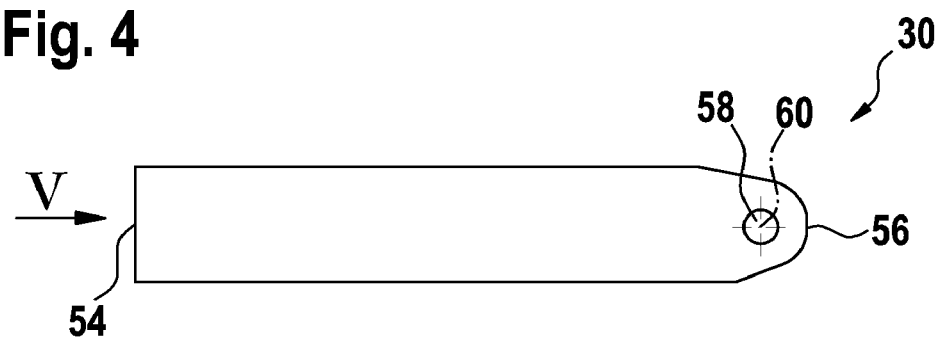

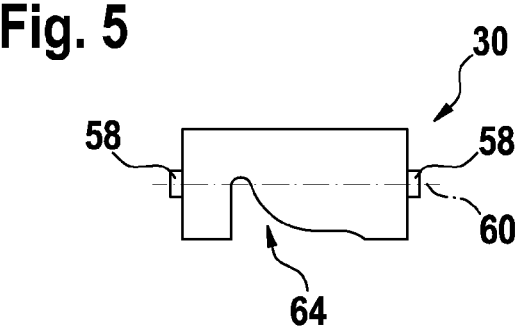
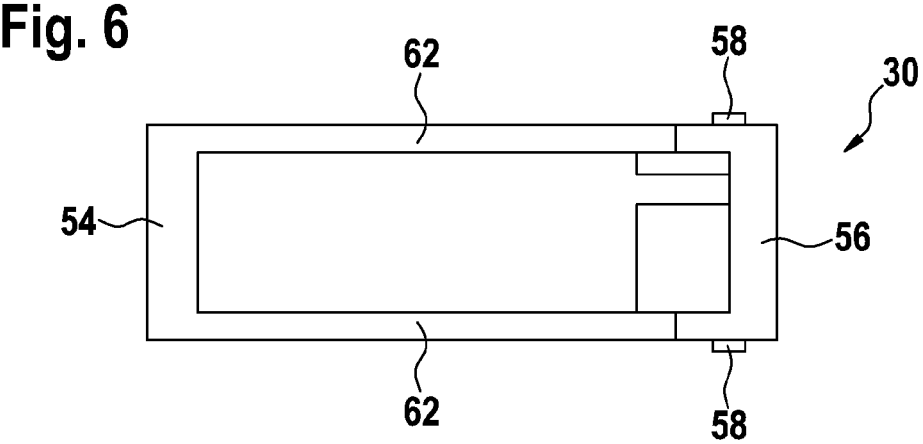
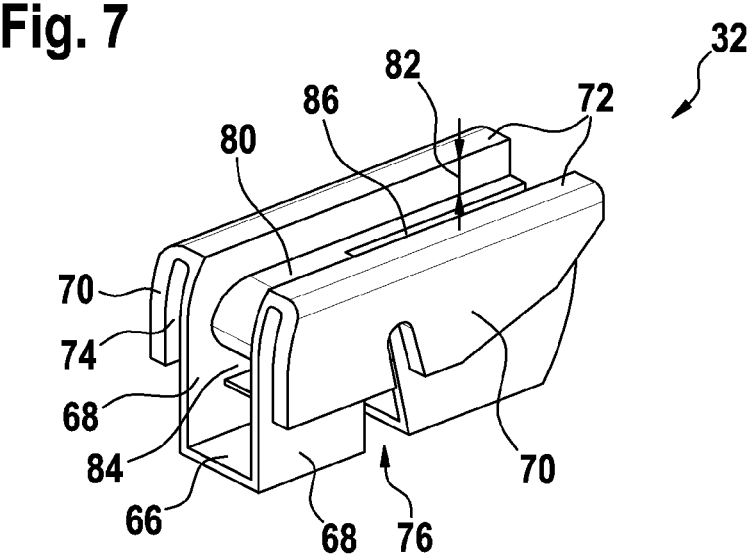

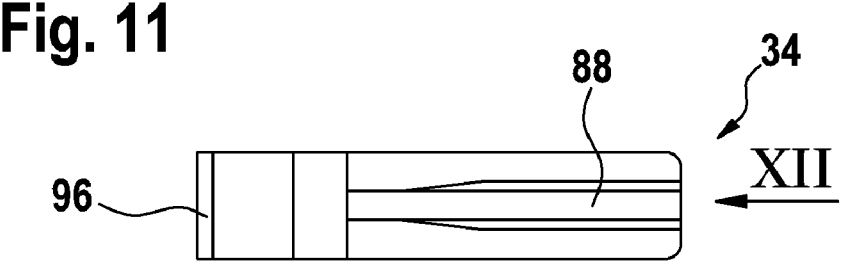
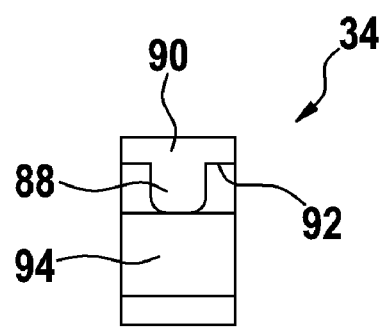
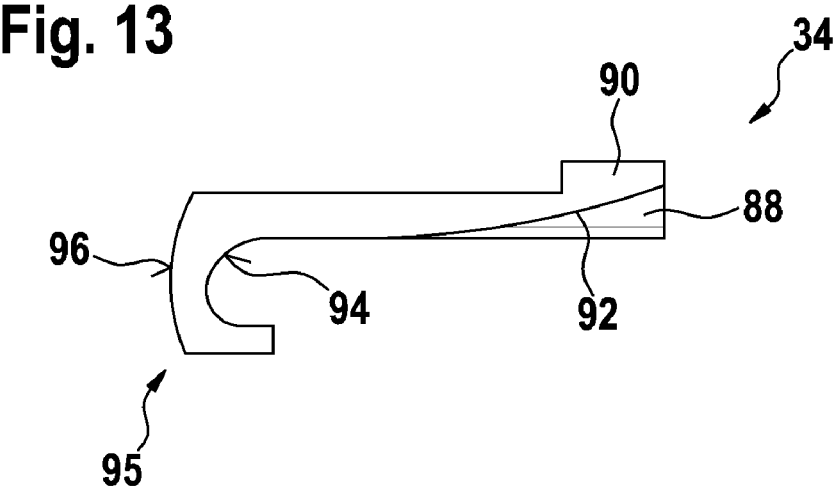

DEVICE FOR THE ARTICULATED CONNECTION OF A WIPER BLADE TO A WIPER ARM OF A WINDSHIELD WIPER

BACKGROUND OF THE INVENTION

The invention proceeds from a device for the articulated connection of a wiper blade to a wiper arm, the device comprising a junction element which is connected fixedly to a carrying element of the wiper blade and has on each longitudinal side, starting from a bottom, a sidewall which is angled with respect to the wiper arm and carries a hinge bolt on which is mounted pivotably an adapter which on each longitudinal side surrounds with an inner sidewall and an outer sidewall the sidewall of the junction element and has, on its side facing the wiper arm, a spring button and, in the region of its sidewalls, guide and holding means for the wiper.

DE 10 2005 016 486 A1 discloses a generic device. The device comprises a junction element which is in the form of a sheet metal claw and of which the dogs integrally formed on the bottom of the sheet metal claw laterally surround a carrying element in the form of two spring rails. The junction element possesses sidewalls which are angled from the bottom towards the wiper arm and which between them carry a hinge bolt which is riveted to bolt heads in the sidewalls.

The device comprises, furthermore, an adapter, the outer sidewalls of which bear with their insides against outsides of the sidewalls of the junction element, while inner sidewalls are supported on the insides of the sidewalls of the junction element. The inner and outer sidewalls of one longitudinal side of the adapter are connected to one another by means of a cover wall. Located at the end pointing toward the free end of the adapter is a hub which is open toward the hinge bolt and by means of which the adapter can be snapped onto the hinge bolt, the bolt heads latching in bearing orifices which are provided in the outer walls of the adapter. Spring tongues are integrally formed, offset with respect to the drive-side end of the junction element, on the inner sidewalls of the adapter, are inclined obliquely outward, engaged through perforations in the sidewalls of the junction element and gaps in the outer sidewalls and co-operate with holding elements on a connection element of the wiper arm.

The connection element is connected fixedly to the wiper arm, for example by being formed in one piece on the latter. The connection element has an essentially U-shaped cross-section, the holding elements being arranged on the free longitudinal edges of the sidewalls. The sidewalls are connected to one another by means of a cover wall in which a latching orifice for a button is located. The connection element is pushed over the adapter, the spring tongues being pressed behind the holding elements, and the button, which may likewise be arranged on a spring tongue, latching into the orifice of the cover wall of the connection element.

SUMMARY OF THE INVENTION

According to the invention, the adapter possesses at least one first adapter element and one second adapter element, the first adapter element having the inner and outer sidewalls, the inner sidewalls of which are connected fixedly to one another via a bottom and a bearing part running with a clearance in relation to the latter. The bearing part possesses an outer contour which is suitable both for receiving a hook-shaped end of the wiper arm and for receiving a second adapter element on which the spring button is arranged. By the multipart adapter being configured according to the invention, it is possible to connect wiper arms having different ends or connection elements to an identical wiper blade, specifically a wiper arm according to the prior art initially described or a wiper arm having a hook-shaped end. In the latter case, the second adapter element is removed, the hook-shaped end of the wiper arm occupying the place of the second adapter element. In this case, it is advantageous that the inner sidewalls of the first adapter element have, with respect to the bearing part, a projection which serves for the lateral guidance of the hook-shaped end of the second adapter element or of the wiper arm.

For connection to wiper arms possessing differently bent hook-shaped ends, it is proposed, according to a refinement of the invention, that the bearing part possess a transversely running gap at its rounded end for the hook-shaped end. If the hook-shaped end has a pronounced bend, the lower leg of the hook-shaped end can engage between the bottom and the bearing part of the junction element, while, in the case of a smaller bend, the lower leg of the hook-shaped end engages into the gap of the bearing part. The position between the wiper blade and the wiper arm with respect to the longitudinal direction can be secured in the usual way by latching hooks and latching holes.

According to one refinement of the invention, the second adapter element possesses the spring button at its end facing the wiper arm, while with its other, hook-shaped end it surrounds the bearing part. The hook-shaped end of the second adapter element is configured essentially identically to the hook-shaped end of a wiper arm, so that it fits with an inner bearing surface onto the bearing part of the first adapter element and on its outside forms an outer supporting surface. For guiding the second adapter element in relation to the first adapter element, a guide web is provided, which extends in the longitudinal direction of the second adapter element and is guided in a guide slot of the bearing part of the first adapter element. The flexibility of the spring button is achieved in a simple way in that the lower contour of the second adapter element is reduced increasingly, on both sides of the guide web, starting from an inner bearing surface. The second adapter element is therefore not supported by the bearing part of the first adapter element in the region of the button, so as to be capable of yielding, while the hook-shaped end is held on the rounded part of the bearing part.

In order to secure the second adapter part or hook-shaped end of a wiper arm in the longitudinal direction in relation to the wiper blade, according to one refinement of the invention a frame is provided, which comprises a region, pointing toward the carrying element, of the junction element and which is fastened to the junction element or to the carrying element. The frame advantageously has, at its end facing the wiper arm, lateral pivot pins which form an axis of articulation and on which a locking cap is mounted in an articulated manner. In the open position, the second adapter element can be inserted into the first adapter element or the hook-shaped end of the wiper arm can be mounted on the bearing part of the first adapter element. In the closed position, the outer contour of the hook-shaped end of the wiper bar or of the second adapter element can be supported on an inner guide surface on one end wall of the locking cap. In this case, it is expedient that the sidewalls of the locking cap have concave guide contours which face the wiper arm. The sidewalls of the initially mentioned wiper arm can thereby pivot, free of constraint, about the hinge bolt.

BRIEF DESCRIPTION OF THE DRAWINGS

Further advantages may be gathered from the following drawing description. The drawing illustrates exemplary embodiments of the invention. The drawing, description and claims contain numerous features in combination. A person skilled in the art will expediently also consider the features individually and combine them into appropriate further combinations.

In the drawing:

FIG. 1 shows a perspective view of a device according to the invention in an exploded illustration, FIG. 2 shows a side view of a junction element, FIG. 3 shows a view in the direction of an arrow III in FIG. 2, FIG. 4 shows a side view of a frame, FIG. 5 shows a view in the direction of an arrow V in FIG. 4, FIG. 6 shows a top view of a frame according to FIG. 4, FIG. 7 shows a perspective view of a first adapter part, FIG. 11 shows a view of a second adapter part from below, FIG. 12 shows a view of a second adapter part in the direction of an arrow XII in FIG. 11, FIG. 13 shows a side view of a second adapter part.

DETAILED DESCRIPTION

Figure 8:
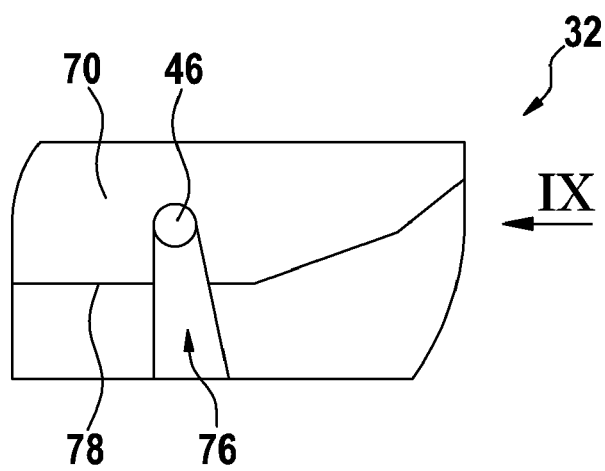
FIG. 8 shows a side view of a first adapter part.
Figure 9:
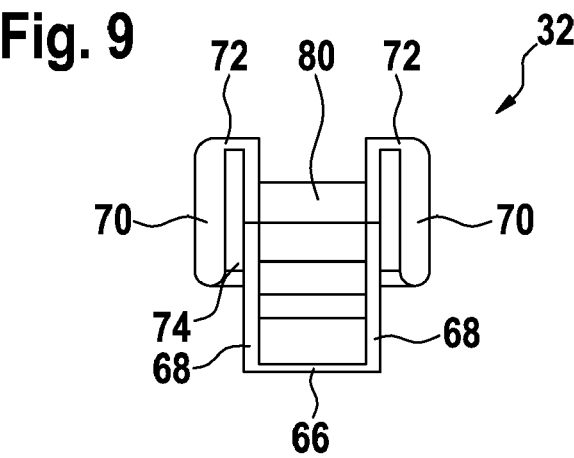
FIG. 9 shows a view of a first adapter part in the direction of an arrow IX in FIG. 8.
Figure 10:
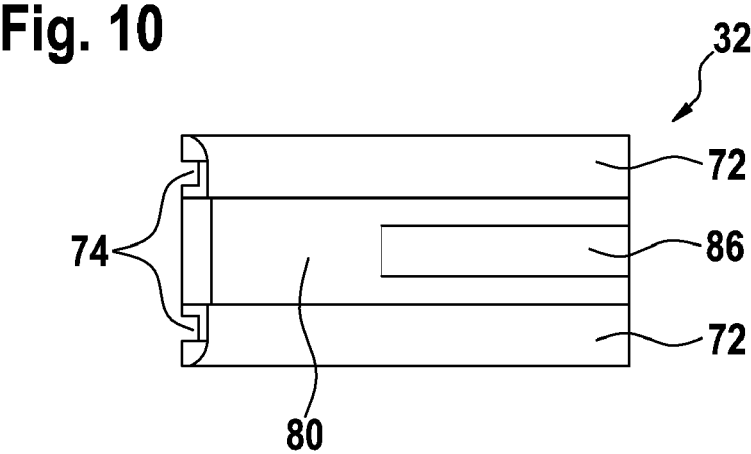
FIG. 10 shows a top view of a first adapter part.
Figure 14:
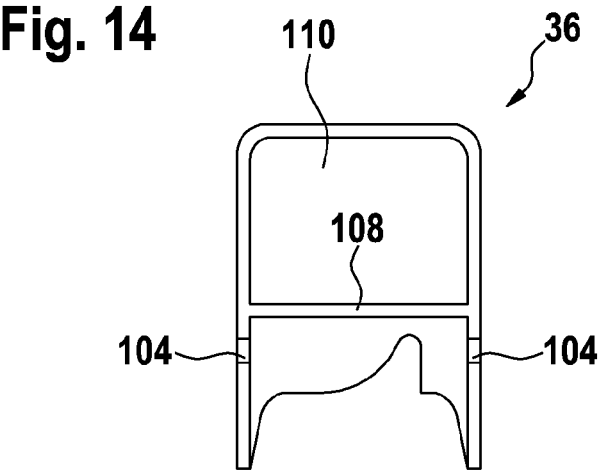
FIG. 14 shows a view of a locking cap in the direction of an arrow XIV in FIG. 15.
Figure 15:
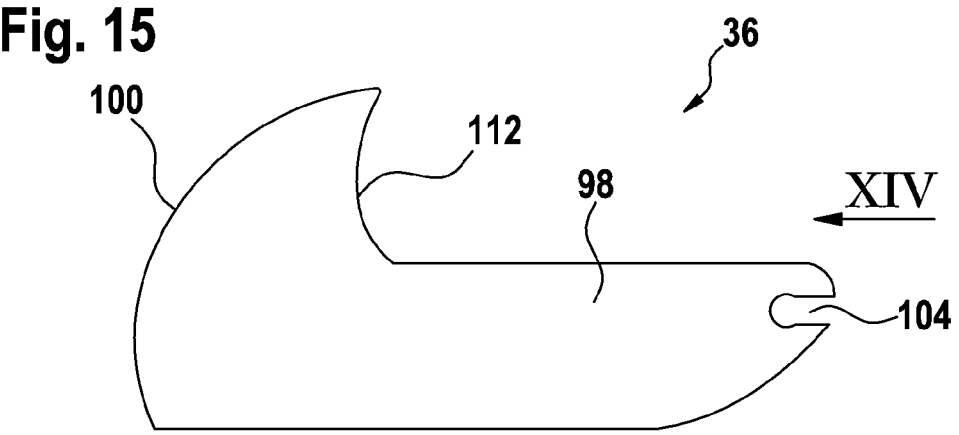
FIG. 15 shows a side view of a locking cap.
Figure 16:
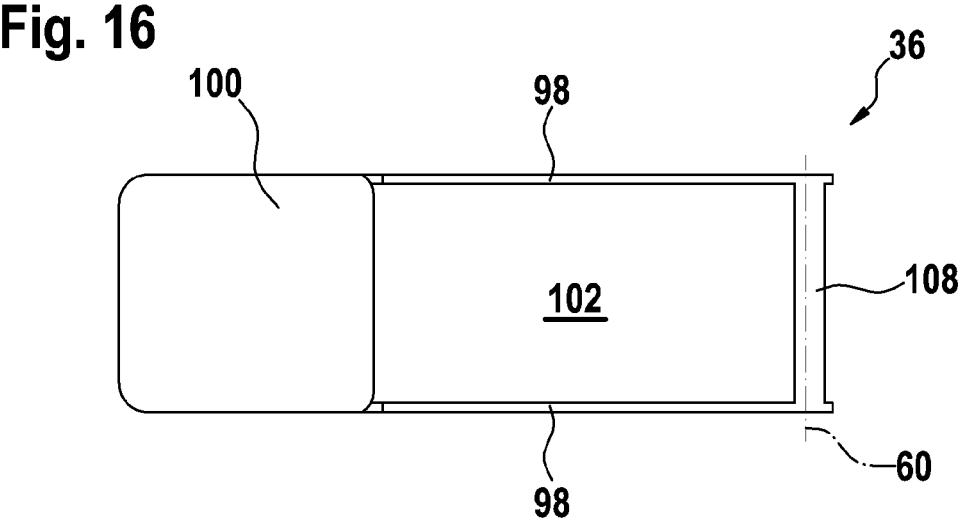
FIG. 16 shows a top view of a locking cap according to FIG. 15.

FIG. 1 shows a wiper blade 12 without end caps, which possesses a wiper strip 14 with a wiper lip 16. The latter is connected to a head strip 20 via a tilting web 18. Provided in the head strip 20 are two lateral longitudinal grooves into which are inserted as a carrying element 22 two spring rails which project laterally a little way out of the longitudinal grooves. A junction 28 in the form of a sheet metal claw is fastened in the middle region of the carrying element 22. Spoiler parts 24 are fastened on the carrying element 22 in the longitudinal direction on both sides of the junction element 28 and between them form an aperture 26 for the junction element 28.

The junction element 28 possesses a bottom 40 which runs parallel to the carrying element 22 and from which two sidewalls are angled approximately perpendicularly in the opposite direction to the wiper strip 14. Dogs 42 are formed out of parts of the sidewalls 38 and are angled toward the carrying element 22. In the assembled state, they surround the carrying element 22 laterally and from below. Orifices 44 lying opposite one another are provided in the sidewalls 38 for a hinge bolt 46 which is riveted fixedly to bolt heads 48 in the orifices 44. An upper edge 50 of the sidewalls 38 descends from a highest point in the region of the orifices 44 to a front end edge 52.

The junction element 28 is surrounded in the region of its bottom 40 by a frame 30 which, with junction profiles 64 in its front wall 54 and its drive-sidewall 56, adjoins the spoiler parts 24 and can be fastened either to the junction element 28 or to the carrying element 22, for example by snapping. The frame 30 possesses on the outsides of its sidewalls 62, in the region of the drive-sidewall 56, pivot pins 58 which form a pivot axis 60. A locking cap 36 is mounted pivotably about the pivot axis 60 on the pivot pins 58.

A first adapter element 32 is connected in an articulated manner to the junction element 28. The junction element 28 possesses a bottom 66 which runs with a clearance parallel to the bottom 40 of the junction element 28 and on the longitudinal sides of which are provided inner sidewalls 68 and outer sidewalls 70 running parallel to the sidewalls 38 of the junction element 28. The inner sidewalls 68 are connected to the outer sidewalls 70 at the edges facing away from the bottom 66 by means of spines 72, so as to form between the inner sidewall 68 and the outer sidewall 70 an interspace 74 into which in each case a sidewall 38 of the junction element 28 fits. In the clearance with respect to the bottom 66, the inner sidewalls 68 are connected to one another by means of a bearing part 80. The bearing part 80 runs approximately parallel to the bottom 66 and possesses a hub 76 which is open toward the bottom 66 and by means of which the first adapter element 32 can be snapped onto the hinge bolt 46 of the junction element 28. Furthermore, the inner sidewalls 68 have, with respect to the bearing part 80, a projection 82 serving for the lateral guidance of a second adapter part 34 which with a hook-shaped end 95 surrounds the rounded end, pointing toward the front end edge 52 of the junction element 28, of the bearing part 80, and an inner bearing surface 94 of the second adapter element 34 bearing against the bearing part 80.

Figure 17:
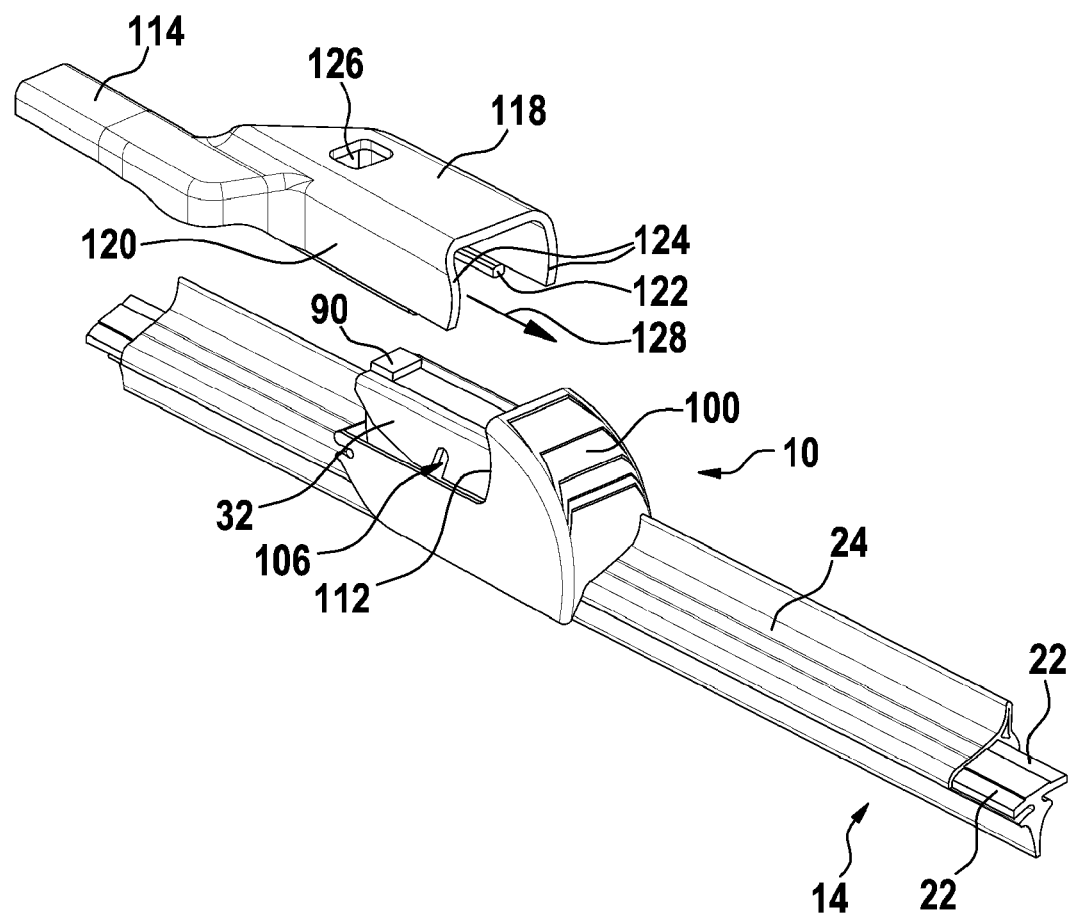
FIG. 17 shows a perspective view of a wiper blade with a device according to the invention during assembly together with a wiper arm.

The second adapter element 34 possesses at the opposite end a guide web 88 which runs in the longitudinal direction and which fits into a corresponding guide slot 86 in the bearing part 80 of the first adapter element 32. On both sides of the guide web 88, the inner bearing surface 94 is reduced in a manner corresponding to a convex lower contour 92, so that, in this region, the second adapter element 34 cannot be supported on the bearing part 80, but, instead, yields in an elastically resilient manner. The second adapter element 34 possesses at this end a spring button 90 which, in the assembled state, protrudes above the spines 72 of the first adapter element 32, so that, in the version according to FIG. 17, a wiper arm 114 can be latched, by means of a latching hole 126 in its cover wall 118, with the spring button 90.

To secure the second adapter element 34 in relation to the first adapter element 32 or a hook-shaped end 134 of a wiper bar 132 in relation to the first adapter element 32, this purpose is served by the locking cap 36 which can be snapped by means of two open hubs 104 in its sidewalls 98 onto the pivot pins 58 of the frame 30. In the open state when the locking cap 36 assumes a position approximately perpendicularly to the wiper blade 12, the second adapter element 34 can be inserted or the hook-shaped end 134 can be mounted in the direction of the arrow 128. This purpose is served by a free space 102 between the sidewalls 98 and an end wall 100 and also a transverse strut 108 which supports the sidewalls 98 with respect to one another for transverse stiffening in the region of the open hubs 104. In the closed state, the end wall 100, with its inner curved guide surface 110, surrounds the hook-shaped end 95 of the second adapter element 34 or the hook-shaped end 134 of the wiper arm 132, so that movement in the longitudinal direction is limited by the guide surface 110 of the locking cap 36, in that an outer bearing surface 96 of the second adapter element 34 or the outside of a bend 136 is supported on the guide surface 110 between an upper leg 138 and a lower leg 140 of the hook-shaped end 134.

When the second adapter element 34 is mounted (FIG. 17), the wiper arm 114 can be pushed over the first adapter element 32 in the direction of the arrow 128. In this case, the sidewalls 120 at the end of the wiper arm 114, which are connected to one another by means of the cover wall 118 and possess guide ribs 122 at their lower edges, surround the outer sidewalls 70 of the first adapter part 32. For this purpose, the outer sidewalls 70 are shorter than the inner sidewalls 68 in the direction of the carrying element 22, and the clearance of their lower edge 78 with respect to the bottom 66 increases in the opposite direction to the arrow 128. In the assembled state, when the spring button is latched into the latching hole 126, the cover wall 118 bears against the spine 72 of the first adapter element 32, while the guide ribs 122 are supported on that region of the lower edge which runs parallel to the spine 72. In order to allow a pivoting movement between the wiper arm 114 and the locking cap 36, without too large a gap being provided between these parts, the end edges 124 of the sidewalls 120 are formed in a manner corresponding to a guide contour 112 of the locking cap 36.

Figure 18:
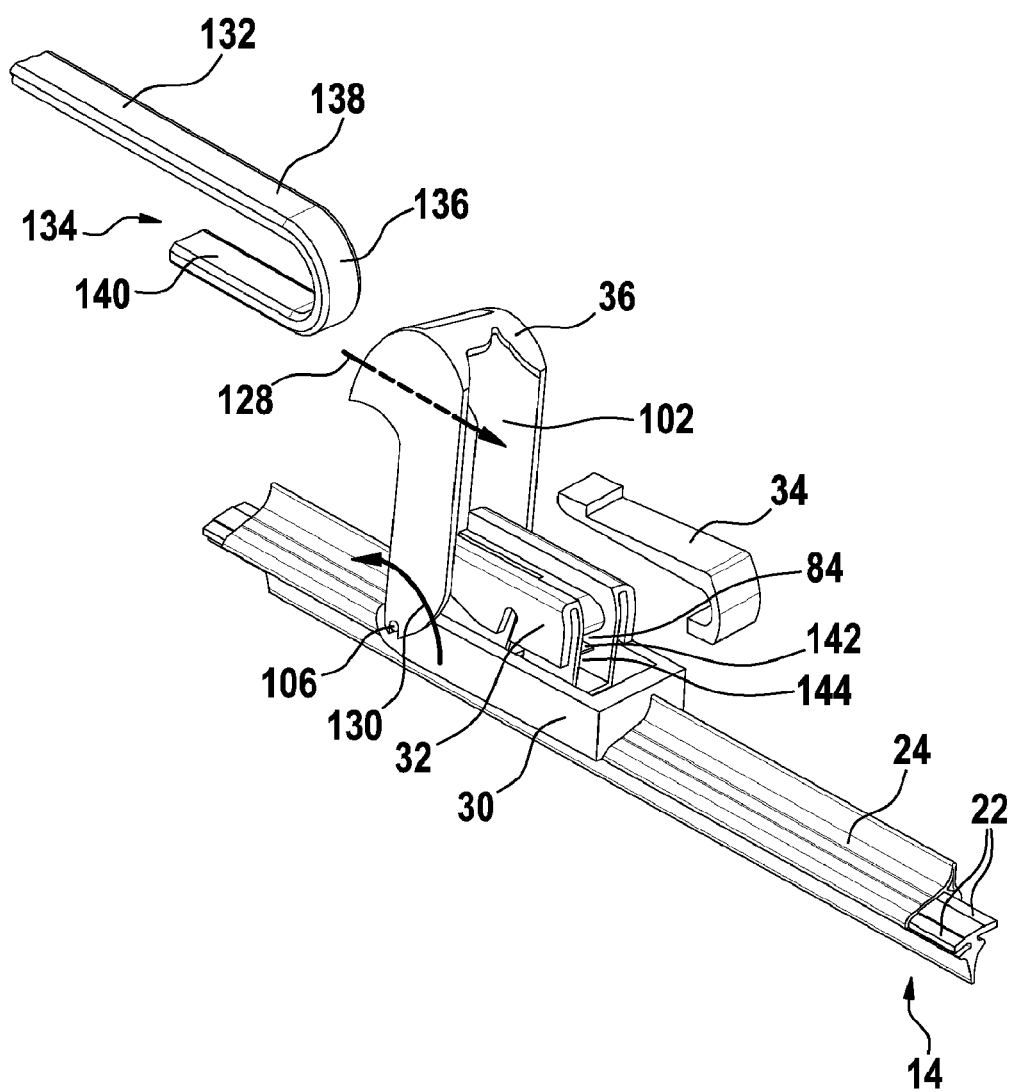
FIG. 18 shows an alternative to FIG. 17.

When the wiper arm 132 having a hook-shaped end 134 (FIG. 18) is mounted, the locking cap 36 is opened in the direction of the arrow 130, and the wiper arm 132 is pushed with its hook-shaped end 134 through the free space 102 in the direction of the arrow 128 and is supported on the bearing part 80. In this case, the upper leg 138 is supported on the top side of the bearing part 80, while the lower leg 140 engages into an interspace 144 between the bottom 66 and the bearing part 80. If a wiper arm 132 with a smaller bend 136 is used, the lower leg 140 can engage into a gap 84 which is provided at the rounded end of the bearing part 80. In this case, that part of the bearing part 80 which points toward the bottom 66 may be designed as a spring tongue 142 and serve additionally for securing the hook-shaped end 134, in that said spring tongue engages with a latching boss, not illustrated, into a corresponding latching orifice of the lower leg 140.

The invention claimed is:

1. A device (10) for the articulated connection of a wiper blade (12) to a wiper arm (114, 132), the device (10) comprising a junction element (28) which is connected fixedly to a carrying element (22) of the wiper blade (12) and has on longitudinal sides of the junction element, starting from a bottom (40), a sidewall (38) which is angled with respect to the wiper arm (114, 132) and carries a hinge bolt (46) on which is mounted pivotably an adapter (32, 34) having longitudinal sides, the adapter on each longitudinal side thereof surrounding with an inner sidewall (68) and an outer sidewall (70) the sidewall (38) of the junction element (28) and the adapter having, on its side facing the wiper arm (114), a spring button (90) and, in the region of its sidewalls (68, 70), guide and holding means (78) for the wiper arm (114, 132), characterized in that the adapter (32, 34) possesses at least one first adapter element (32) and one second adapter element (34), the first adapter element (32) having the inner and outer sidewalls (68, 70), the inner sidewalls (68) of which are connected fixedly to one another via a bottom (66) and a bearing part (80) running with a clearance in relation to the bottom, the bearing part (80) possessing an outer contour configured to both receive a hook-shaped end (134) of the wiper arm (132) and receive the second adapter element (34) on which the spring button (90) is located.

2. The device (10) as claimed in claim 1, wherein the first adapter element (32) is configured to be snapped with a hub (76) open towards the bottom (66) onto the hinge bolt (46).

3. The device (10) as claimed in claim 1, wherein the inner sidewalls (68) have, with respect to the bearing part (80), a projection (82) which serves for the lateral guidance of the hook-shaped end (95, 134) of the second adapter element (34) or of the wiper arm (114).

4. The device (10) as claimed in claim 3, wherein the bearing part (80) possesses a transversely running gap (84) at a rounded end for the hook-shaped end (95, 134).

5. The device (10) as claimed in claim 1, wherein the inner sidewall (68) is connected to the outer sidewall (70) by a spine (72), the outer sidewall (70) being shorter in the direction of the carrying element (22) and possessing a lower edge (78).

6. The device (10) as claimed in claim 5, wherein the lower edge (78) runs parallel to the bottom (66) in the region of an open hub (76) and approaches the spine (72) in a convex contour with respect to a wiper-arm-side end of the first adapter element (32).

7. The device (10) as claimed in claim 1, wherein the second adapter element (34) has the spring button (90) at an end facing the wiper arm (114), while with an other, hook-shaped end (134) the second adapter element surrounds the bearing part (80).

8. The device (10) as claimed in claim 7, wherein the second adapter element (34) has, in a region of the spring button (90), a guide web (88) which is guided in a guide slot (86) of the bearing part (80) of the first adapter element (32).

9. The device (10) as claimed in claim 8, wherein a lower contour (92) of the second adapter element (34) is reduced increasingly, on both sides of the guide web (88), starting from an inner bearing surface (94).

10. The device (10) as claimed in claim 1, wherein a frame (30) comprises a region, pointing toward the carrying element (22), of the junction element (28) and is fastened to the junction element (28) or to the carrying element (22).

11. The device (10) as claimed in claim 10, wherein the frame (30) possesses, at an end facing the wiper arm (114, 132), lateral pivot pins (58) which form an axis of articulation (60) and on which a locking cap (36) is mounted in an articulated manner.

12. The device (10) as claimed in claim 11, wherein the locking cap (36) is snapped with open hubs (104) onto the pivot pins (58).

13. The device (10) as claimed in claim 11, wherein, at an end facing away from the pivot pins (58), the locking cap (36) has a guide surface (110) which, when the locking cap (36) is in a closed state, limits axial movement of the second adapter element (34) or of the hook-shaped end (134) of the wiper arm (132) in relation to the first adapter element (32).

14. The device (10) as claimed in claim 11, wherein sidewalls (98) of the locking cap (36) have concave guide contours (112) which face the wiper arm (114).

15. A wiper assembly comprising a wiper blade and a device for the articulated connection of the wiper blade (12) to a wiper arm (114, 132), the device (10) comprising a junction element (28) which is connected fixedly to a carrying element (22) of the wiper blade (12) and has on longitudinal sides of the junction element, starting from a bottom (40), a sidewall (38) which is angled with respect to the wiper arm (114, 132) and carries a hinge bolt (46) on which is mounted pivotably an adapter (32, 34) having longitudinal sides, the adapter on each longitudinal side thereof surrounding with an inner sidewall (68) and an outer sidewall (70) the sidewall (38) of the junction element (28) and the adapter having, on its side facing the wiper arm (114), a spring button (90) and, in the region of its sidewalls (68, 70), guide and holding means (78) for the wiper arm (114, 132), characterized in that the adapter (32, 34) possesses at least one first adapter element (32) and one second adapter element (34), the first adapter element (32) having the inner and outer sidewalls (68, 70), the inner sidewalls (68) of which are connected fixedly to one another via a bottom (66) and a bearing part (80) running with a clearance in relation to the bottom, the bearing part (80)

possessing an outer contour configured to both receive a hook-shaped end (134) of the wiper arm (132) and receive the second adapter element (34) on which the spring button (90) is located.

\* \* \* \* \*

UNITED STATES PATENT AND TRADEMARK OFFICE
CERTIFICATE OF CORRECTION

PATENT NO. : 8,484,794 B2  Page 1 of 1
APPLICATION NO. : 13/063521
DATED : July 16, 2013
INVENTOR(S) : Westermann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this
Eighth Day of September, 2015

Michelle K. Lee
*Director of the United States Patent and Trademark Office*